United States Patent [19]

Campbell

[11] 4,265,981
[45] May 5, 1981

[54] IMPACT-RESISTING COMPOSITES

[75] Inventor: Malcolm D. Campbell, Ashwood, Australia

[73] Assignee: Commonwealth Scientific and Industrial Research Organization, Australian Capital Territory, Australia

[21] Appl. No.: 81,424

[22] Filed: Oct. 3, 1979

Related U.S. Application Data

[63] Continuation of Ser. No. 906,302, May 15, 1978, abandoned.

[30] Foreign Application Priority Data

May 17, 1977 [AU] Australia .............................. PD0123

[51] Int. Cl.³ ...................... B32B 5/12; D03D 13/00; D02G 3/00; B65H 81/00
[52] U.S. Cl. .................................... 428/591; 428/222; 428/253; 428/365; 428/373; 428/377; 428/114; 156/172; 156/180; 156/195; 156/181
[58] Field of Search ............... 428/114, 222, 253, 254, 428/365, 373, 377; 156/191, 195, 172, 180, 181, 53, 56, 54

[56] References Cited

U.S. PATENT DOCUMENTS

| 2,694,661 | 11/1954 | Meyer | 156/180 |
|---|---|---|---|
| 2,827,099 | 3/1958 | Youngs | 156/180 |
| 2,992,150 | 7/1961 | Goy | 428/373 |
| 3,475,264 | 10/1969 | Donaldson | 428/114 |
| 3,625,809 | 12/1971 | Caroselli et al. | 428/222 |
| 3,644,866 | 2/1972 | Deardurff | 428/377 |
| 3,672,241 | 6/1972 | Rabenhorst | 428/114 |
| 3,756,905 | 9/1973 | Mills et al. | 428/114 |
| 3,895,162 | 7/1975 | Lemont et al. | 156/181 |
| 3,969,169 | 7/1976 | Santos, Jr. et al. | 156/56 |
| 4,079,165 | 3/1978 | Morley | 428/377 |
| 4,119,748 | 10/1978 | Verbauwhede et al. | 156/180 |
| 4,142,017 | 2/1979 | Blackburn et al. | 428/253 |

*Primary Examiner*—William R. Dixon, Jr.
*Attorney, Agent, or Firm*—Sughrue, Rothwell, Mion, Zinn & Macpeak

[57] ABSTRACT

Energy absorbing composite materials for use as building elements and the manufacture of articles having fail-safe characteristics. The composite comprises a plurality of helically wrapped reinforcing filaments embedded in a matrix material.

13 Claims, 5 Drawing Figures

IMPACT-RESISTING COMPOSITES

This is a continuation of application Ser. No. 906,302, filed May 15, 1978, abandoned.

This invention relates to a composite material and to a method of making same.

The object of the invention is to provide a reinforced material which may be used as an energy absorbing structural member in the fabrication of buildings and the manufacture of articles for which failsafe and energy absorbing characteristics are desirable.

According to one aspect of the invention, there is provided a composite comprising a substantially continuous matrix in which is embedded reinforcing elements of higher tensile strength than the matrix, each reinforcing element being separated from the matrix by one or more continuous helical wrappings of flexible material.

In a further aspect of the invention, there is provided a method for making a reinforced composite comprising the steps of helically wrapping one or more reinforcing elements with a flexible material, coating the thus wrapped elements with a hardenable matrix of lower tensile strength than the reinforcing elements, and setting the thus applied matrix. The additional step of compacting an assemblage of the coated elements immediately prior to setting the matrix may also be undertaken.

In a modification of the process, the flexible material is coated on one side with the matrix material prior to wrapping the reinforcing elements. The wrapping step is then carried out such that the coating appears on the outermost surface.

THE MATRIX

The matrix consists of a material that can be solidified from the liquid state. The function of the matrix is to transfer load between the wrappings of the reinforcing elements. It is important that the matrix does not infiltrate the wrapping to any great extent as the frictional nature of the bond between the reinforcing element and the wrapping may be lost and hence the toughness of the composite will be reduced. When the reinforcing elements are loaded in compression along their long axes the matrix also serves to inhibit buckling.

Suitable matrix materials include thermosetting polymers such as urea formaldehyde, polyester, epoxy and phenolic resins; thermoplastic polymers such as bitumin, polyethylene, polyvinyl chloride and polypropylene; and inorganic compounds and compositions such as plaster, cement, mortar and concrete. In some applications a metal matrix such as aluminium or copper may be employed.

THE REINFORCING ELEMENT

The reinforcing element is required to have a higher tensile strength and will preferably have a higher elastic modulus than the matrix. The reinforcing element ideally consists of a single filament or multiple parallel filaments. In the case of a multiple filament element, the mechanical properties, especially the compression strength parallel to the filaments, of the composite may be improved if the filaments are bonded together. This is because load transfer between the individual filaments is improved. If multiple filaments are employed, they may be discontinuous provided the discontinuities do not coincide. When multiple discontinuous filaments are used additional energy may be absorbed at fracture due to the drafting of these filaments. Multiple filaments may also be twisted together to form the reinforcing elements.

Suitable reinforcing elements include metallic filaments such as steel, titanium and copper wires; ceramic filaments such as carbon and glass fibres; polymeric filaments such as nylon, aramid and polypropylene fibres; boron fibres; vegetable fibres such as sisal and cotton; and twisted paper.

THE WRAPPING

The wrapping should preferably be continuous, flexible and either in the form of a strip or a filament. Single or multiple wraps may be employed. During manufacture the wrapping is tightly wound onto the reinforcing element, in a helical fashion. The amount of tension applied during wrapping and the angle of the helix can be optimized for a particular composite application.

The helices of adjacent wrappings should preferably have opposite senses in order to prevent warping of the composite, this is especially necessary if wrapping materials are used that are dimensionally unstable due to temperature or moisture. When multiple wrap elements are used, then the sense of alternate wraps may be varied. Such multiple wrap elements may, furthermore, be braided. If a wrap or core material is used that is extremely vulnerable to water, e.g. paper, then the composite and/or the wrapped element may require a continuous waterproof coating.

Suitable wrapping materials include paper; metallic wire or foil such as steel, aluminium and copper; polymer filaments such as nylon, aramid and polyester; ceramic fibres such as carbon and glass fibres; and vegetable fibres such as sisal, hemp and cotton.

No specific orientation of the reinforcing elements within the composite is required; however, optimum packing and mechanical properties are achieved when the long axes of the elements are aligned in the direction of the principle stresses. When such an aligned composite containing continuous reinforcing elements is loaded by a tensile force parallel to the long axis of the elements, load is transferred between the wrappings of the reinforcing elements by the matrix and between the outer wrapping of the element and the reinforcing element itself by frictional forces. As the applied load increases, the helix of the wrap extends in length and reduces in diameter and hence, the normal stresses between the wrapping and the reinforcing element increases. This results in an increase in the frictional forces between the reinforcing element and the wrapping and as a result, there is an increase in the load transferred to the reinforcing element. When the wrapping fractures, the reinforcing element is withdrawn from the wrapping, but the pull out occurs at a controlled rate due to the frictional constraint of the wrapping. In this way a composite that absorbs large amounts of energy at failure is provided and as long as the reinforcing elements do not fracture, a fail-safe structure is formed.

When the aligned composite is loaded by a compression force parallel to the long axis of the reinforcing elements, the helical wrap supports the load bearing reinforcing element against buckling. The degree of support is determined by the amount of pre-tension in the wrapping and the helix angle. As the load is applied, the length of the wrap helix decreases and the diameter increases. This allows the reinforcing element to buckle stably, thus ensuring a noncatastrophic failure.

The reinforcing element/wrapping combination may be used to selectively toughen a structure. For example, a considerable degree of toughening and strengthening is achieved in a structural component which is subjected to bending, by reinforcing material of low strength and toughness, such as polyurethane foam or twisted paper with high strength, high modulus elements on the tensile and compression surfaces only. Alternatively, the composite may be used as a core for a high strength, high modulus, low toughness material, for example, carbon fibre reinforced epoxy resin.

The composite may be used in any structure requiring energy absorbing and fail-safe characteristics. Structures such as motor car bumpers, highway railings, car park buffers and marine and railway fenders, flywheels, guideposts and seatbelt fixtures, may be constructed from composites preferably containing parallel reinforcing elements. Energy absorbing panels may also be manufactured using either randomly or selectively oriented, for example, woven or knitted, reinforcing elements. The composite is suitable for blast and shock absorbing structures, for example, cyclone proof dwellings and transportation containers. The fail-safe characteristics of the composite can be suitably utilized for ladders, scaffolding, formwork and tunnel linings. The composite can exhibit very large deflections before the maximum load point is reached.

The composite may be manufactured using processes such as pultrusion, press moulding and coextrusion. If a foamed plastic matrix is used, the composite can be formed by in situ foaming.

The amount of energy absorbed by the composite during fracture has been found to be substantially independent of the rate at which the load is applied. The composite material can be described as being substantially notch insensitive. This is due to crack blunting action of the reinforcing elements.

Preferred embodiments of the invention will now be described with reference to the accompanying drawings, in which.

Figure 1:
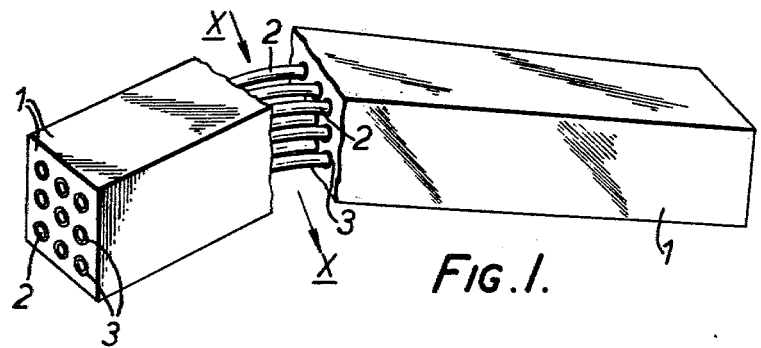
FIG. 1 is a perspective view of a composite according to the invention which has been fractured by a load applied perpendicular to the reinforcing elements.

Referring to FIG. 1, there is illustrated a composite comprising a polyester resin matrix 1 in which is embedded nine sisal reinforcing elements 2. Each reinforcing element is wrapped in paper 3. The composite has been press-moulded into a square section elongated structural member with the reinforcing elements 2 extending along the length of the member. For the purposes of illustration, the member has been fractured by a force acting in the direction X—X. It will be observed that although the matrix and the wrap have ruptured, the structural member is still held together by the sisal reinforcing elements 2.

Figures 2, 3:
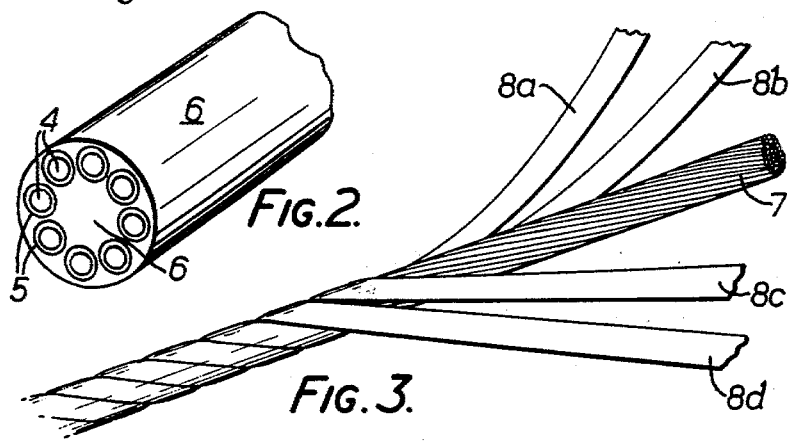
FIG. 2 is an end-on perspective view of a further composite according to the invention.
FIG. 3 is a perspective view of a reinforcing element with a wrapping for use in a composite.

FIG. 2 illustrates a lightweight energy absorbing composite. This composite has a plurality of reinforcing elements comprising twisted paper cord 4 extending along a circular section member in the peripheral region of the member. The wrapping 5 is a paper wrapping and the matrix 6 is a foamed polyurethane.

FIG. 3 illustrates a preferred method of wrapping a reinforcing element. In this case, a reinforcing element of sisal 7 is helically wrapped in four strips of paper wrapping 8a, 8b, 8c and 8d.

Figures 4, 5:
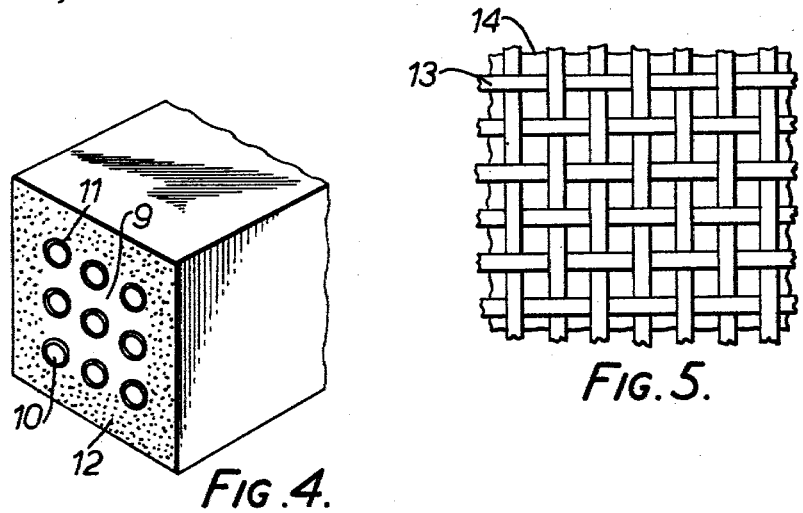
FIG. 4 is an end-on perspective of a further composite according to the invention.
FIG. 5 is a plan view of a woven composite material.

FIG. 4 illustrates a composite comprising an epoxy resin matrix 9 in which is embedded glass fibre reinforcing elements 10 wrapped in paper 11. Surrounding the core of elements, the epoxy resin is further strengthened with carbon fibres 12.

FIG. 5 illustrates a composite comprising a woven material of paper wrapped glass 13 embedded in a polyester matrix 14.

EXAMPLE 1

Reinforcing elements of "binder twine", a sisal rope of approximately 2.5 mm diameter in which the filaments are substantially parallel, were wrapped with four overlapping layers of sack kraft paper (44 gsm), 30 mm wide. The resulting wrapped element has an outer diameter of approximately 5 mm. Ten of these wrapped elements were coated with Monsanto Polyester resin D3679 containing 0.6% t-butyl benzoate catalyst, placed in two layers in a 25 mm wide mould and pressed at a temperature of 130° C. and a pressure of 2.8 MPa for 15 minutes. This specimen was tested in flexture. A similar composite was prepared from 16 wrapped elements in four layers in a 19 mm mould, and was tested in impact. The specific gravity of the composites was 1.1 and 20% by weight of resin matrix was used.

The modulus of rupture of this material was 87 MPa and the Izod impact toughness for a 19 mm square unnotched specimen was 31 J. The Izod energy was an underestimate as the specimen did not fracture into two pieces.

EXAMPLE 2

In this example, a composite similar to that described in Example 1 was prepared, except that the specimens had an inner section in which the reinforcing elements consisted simply of spirally twisted 30 mm sack kraft paper cord (3 mm in diameter). Samples for flexural testing were made as in Example 1, with two layers of six twisted paper cords interposed between the layers of wrapped reinforcing elements. Samples for impact testing comprised an outer single layer of four by five wrapped sisal elements and an inner section of eight twisted paper elements. The specific gravity of the composites was 1.1 and 20% resin by weight was used.

The modulus of rupture of this composite was 113 MPa and the Izod impact toughness for a 19 mm square unnotched specimen was greater than 40 J. The specimen did not fracture cleanly.

EXAMPLE 3

For comparison, a composite material was prepared in the same manner as Example 1, using as reinforcing elements the spirally twisted paper cord described in Example 2 as follows:

For flexural testing, two layers of seven
For impact testing, six layers of five The composite had a specific gravity of 1.1 and 32% of resin was used.

The modulus of rupture of this material was 90 MPa and the Izod impact toughness for a 19 mm square unnotched specimen was 10 J. The specimen fractured cleanly and exhibited none of the toughness or fail-safe characteristics of the composites of this invention.

MECHANICAL PROPERTIES OF THE COMPOSITE

While it is difficult to conduct an accurate comparison of mechanical properties between different materials, some indication of the relative performance of a composite utilizing the wrapped element structure can be gained by a comparison with two structural grade timbers, *Eucalyptus regnans* (hardwood) and *Pinus radiata* (softwood) with 12% moisture content.

TABLE 1

| Physical Property | Eucalyptus regnans | Pinus radiata | Composite (Example 2) |
|---|---|---|---|
| Density (g/cc) | 0.7 | 0.5 | 1.1 |
| Modulus of rupture (MPa) | 137 | 80 | 113 |
| Bending Limit of proportionality (MPa) | 90 | 46 | 75 |
| Elastic modulus (GPa) | 16.9 | 10.2 | 8.5 |
| Izod Impact (J) | 22 | 8 | >40(~80) |

The Table 1 it is evident that the impact toughness of the composite is vastly greater than that of either of the timbers. The flexural properties are an indication of what can be achieved using a sisal cord reinforcing element. If a higher modulus core material had been used, the flexural properties would have been greater.

EXAMPLE 4

Three composite materials were manufactured by press moulding using Monsanto Polyester resin 270M containing 1% benzoyl peroxide catalyst at a temperature of 150° C. for ten minutes. The specimens were 400 mm long with a cross section of 15×15 mm. Specimens of the composites were notched and the fracture surface energy was measured by the method described by M. J. CHAPPELL and J. G. MORLEY in "The fracture toughness of conventional materials and composite systems containing non fracturing reinforcing elements" Journal of Materials Science, Vol. II, (1976), PP 57-70, (ref. 1).

Composite 1

The reinforcing elements were multiple continuous E glass filaments having a total weight of 28 g/m. The wrap was electrical grade paper 6 mm wide with a weight of 0.20 g/m. The total wrapped element diameter was 0.8 mm. 8% by weight resin matrix was used. 480 Reinforcing elements were used.

Composite 2

The reinforcing elements were multiple continuous E glass filaments having a total weight of 28 g/m. The wrap was Kraft paper 12 mm wide with a weight of 0.51 g/m. The total wrapped element diameter was 1.0 mm. 30% by weight resin matrix was used. 260 Reinforcing elements were used.

Composite 3

The reinforcing elements were multiple continuous tyre cord nylon filaments having a total weight of 0.11 g/m. The wrap was two layers of Kraft paper each 12 mm wide with a weight of 1.1 g/m. The total wrapped element diameter was 1.3 mm. 9% by weight resin matrix was used. 135 reinforcing elements were used.

The results of the fracture surface energy tests are shown in Table 2 along with the results for other material presented in ref. 1 (supra). The superior energy absorbing ability of the composites is evident. However these composites do not represent the limit of the energy absorbing capacity of these materials.

TABLE 2

COMPARATIVE FRACTURE SURFACE ENERGIES

| MATERIAL | AVERAGE FRACTURE SURFACE ENERGY ($Jm^{-2} \times 10^{-4}$) | SPECIFIC GRAVITY | SPECIFIC FRACTURE SURFACE ENERGY ($Jm^{-2} \times 10^{-4}$) |
|---|---|---|---|
| COMPOSITE 1 | 8.4 | 1.4 | 6.1 |
| COMPOSITE 2 | 5.9 | 1.3 | 4.4 |
| ALUMINUM | 8.6 | 2.7 | 3.2 |
| COMPOSITE 3 | 2.6 | 0.96 | 2.7 |
| MILD STEEL | 4.8 | 7.8 | 0.6 |
| ALUMINUM ALLOY | 2.1 | 2.8 | 0.8 |
| TEAK WOOD | 0.8-1.6 | 0.8 | 1.0-2.0 |
| EPOXY RESIN | 0.1 | 1.2 | 0.1 |
| POLYMETHYLMETHACRYLATE | 0.1 | 1.2 | 0.1 |

EXAMPLE 5

A range of aligned composite materials, as summarized in Table 23, were manufactured by press moulding. The materials were tested in three point bending at a span to depth ratio of 16:1. The range of composite properties that can be achieved is demonstrated.

TABLE 3

COMPOSITE MATERIAL PROPERTIES

| REINFORCING ELEMENTS | WRAP | TOTAL DIAMETER (MM) | MATRIX | MATRIX % WGT | SPECIFIC GRAVITY | FLEXURAL MODULUS (MPa) | FLEXURAL STRENGTH (MPa) | SPECIFIC STRENGTH (MPa) |
|---|---|---|---|---|---|---|---|---|
| GLASS FILAMENTS | KRAFT PAPER | 0.8 | POLYESTER* | 28 | 1.4 | 21500 | 358 | 256 |
| DRAWN STEEL | KRAFT PAPER | 4 | U.F.+ | 1 | 2.7 | 22400 | 277 | 103 |
| SOFT STEEL | KRAFT PAPER | 3.5 | U.F.+ | 7 | 2.2 | 16950 | 116 | 53 |
| NYLON FILAMENTS | KRAFT PAPER | 1.3 | POLYESTER* | 21 | 1.0 | 8700 | 114 | 114 |
| **SISAL | KRAFT | 5 | U.F.+ | 19 | 1.3 | 8460 | 114 | 88 |

TABLE 3-continued

| | | COMPOSITE MATERIAL PROPERTIES | | | | | |
|---|---|---|---|---|---|---|---|
| | COMPOSITE MATERIAL | | | | | | |
| REINFORCING ELEMENTS | WRAP | TOTAL DIAMETER (MM) | MATRIX | MATRIX % WGT | SPECIFIC GRAVITY | FLEXURAL MODULUS (MPa) | FLEXURAL STRENGTH (MPa) | SPECIFIC STRENGTH (MPa) |
| ALUMINIUM WIRE | PAPER KRAFT | 2 | POLY-ESTER* | 48 | 1.5 | 22200 | 88 | 58 |
| POLYPROPYLENE FILAMENTS | PAPER KRAFT | 5 | POLY-ESTER* | 22 | 1.1 | 7000 | 78 | 71 |
| TWISTED PAPER | PAPER KRAFT | 9 | U.F.+ | 13 | 1.0 | 5100 | 69 | 69 |
| COPPER WIRE | PAPER KRAFT PAPER | 1 | POLY-ESTER* | 14 | 2.6 | 17500 | 57 | 22 |

\*\*Wrapped elements only on outer layer, twisted paper core
+U.F. = Urea-formaldehyde supplied by I.C.I. 65% wgt. solids. cat. 3% (NH$_4$)$_2$SO$_4$.
*Polyester = Same as example 1

EXAMPLE 6

Two composite panels were manufactured by press molding using Monsanto Polyester resin 270M with 1% benzoyl peroxide catalyst and a cure temperature of 150° C. per 10 minutes.

Composite 1

The wrapped reinforcing elements were of the type described in composite 3 of example 4. These elements were woven into a mat with 4 elements per cm on the warp and weft.

Composite 2

The wrapped reinforcing elements were of the type described in composite 2 of example 4. Two layers of these elements were cross laminated.

In a puncture test using a GE Boxboard Tester to the TAPPI specification both composites were found to have a resistance to penetration similar to that of 0.5 mm mild steel sheet.

It is to be particularly noted that the term "matrix" used throughout the specification and claims refers to any material that can be solidified from the liquid state and remain solidified after the composite has been formed, but excludes rubber-like elastomeric materials.

I claim:

1. A composite comprising a substantially continuous matrix material selected from the group comprising thermosetting polymers, thermoplastic polymers, plaster, cement, mortar, concrete and metals; in which is embedded a plurality of reinforcing elements of higher tensile strength than the matrix, which reinforcing elements are selected from the group comprising metallic filaments, ceramic filaments, polymeric filaments, boron filaments, vegetable fibers and twisted paper; each reinforcing element being separated from the matrix by a continuous helical wrapping means of flexible material which is bonded to the matrix and which is selected from the group comprising paper, metallic wire, metallic foil, polymeric film, polymeric filaments and ceramic fibers; the strength of the wrapping means being such that the wrapping means fails at a lower tensile load than the reinforcing element, and the construction and arrangement of said wrapping means being such when the composite is subjected to a tensile load along the axis of the reinforcing element, the wrapping means contracts onto the reinforcing element to thereby increase the interaction between the wrapping means and the reinforcing element until the point at which the wrapping means fractures, thereby permitting the reinforcing element to slip within the wrapping means.

2. A composite as claimed in claim 1, wherein each reinforcing element consists of a single filament or multiple substantially parallel filaments.

3. A composite as claimed in claim 2, comprising multiple substantially parallel filaments which are bonded together.

4. A composite as claimed in claim 2, comprising multiple substantially parallel filaments which are discontinuous.

5. A composite as claimed in claim 2, wherein each reinforcing element is twisted and comprises multiple substantially parallel filaments.

6. A composite as claimed in claim 1, wherein the wrapped reinforcing elements are sufficiently flexible to be knitted or woven into a fabric.

7. A composite as claimed in claim 1, wherein adjacent reinforcing elements are helically wrapped in opposite senses.

8. A composite as claimed in claim 1, wherein there are two or more helical wrapping means about each reinforcing element, the adjacent wrapping means preferably being of opposite sense.

9. A composite as claimed in claim 1, wherein there are two or more helical wrapping means about each reinforcing element, the said wrapping means being braided together.

10. A composite as claimed in any one of claims 1 to 9, wherein (i) the matrix material is selected from the group comprising: urea formaldehyde resins, polyester resins, epoxy resins, phenolic resins, bitumin, polyethylene, polyvinyl chloride, polypropylene, aluminum and copper; (ii) the reinforcing elements are selected from the group comprising: steel wires, titanium wires, copper wires, carbon fibers, glass fibers, nylon fibers aramid fibers, boron fibers, polypropylene fibers, sisal and cotton, and (iii) and wrapping means of flexible material is selected from the group comprising steel wire and foil, aluminum wire and foil, copper wire and foil, nylon film and fiber, aramid fiber, polyester film and fiber, carbon fiber and, glass fiber.

11. A method for making a reinforced composite comprising the steps of helically wrapping each one of a plurality of reinforcing elements with a flexible material, coating the thus wrapped elements with a hardenable matrix of lower tensile strength than the reinforcing elements, bringing together an assemblage of the coated elements, and setting the matrix.

12. A method as claimed in claim 11 and including the step of compacting the assemblage of the coated elements immediately prior to setting the matrix.

13. A method as claimed in claim 11 or claim 12 wherein the flexible material is coated on one side with the matrix material prior to wrapping the reinforcing element, the wrapping step being carried out in such a manner that the coating appears on the outermost surface.

* * * * *